US 6,552,862 B2

(12) United States Patent  (10) Patent No.: US 6,552,862 B2
Dieker  (45) Date of Patent: Apr. 22, 2003

(54) MOUNTING DEVICE FOR AN OPTICAL ELEMENT

(75) Inventor: Thomas Dieker, Ulm (DE)

(73) Assignee: Carl-Zeiss-Stiftung (DE)

( * ) Notice: Subject to any disclaimer, the term of this patent is extended or adjusted under 35 U.S.C. 154(b) by 0 days.

(21) Appl. No.: 09/999,892

(22) Filed: Oct. 31, 2001

(65) Prior Publication Data

US 2002/0085291 A1 Jul. 4, 2002

(30) Foreign Application Priority Data

Oct. 31, 2000 (DE) .......................... 100 53 899

(51) Int. Cl.⁷ ................................ G02B 7/02
(52) U.S. Cl. ...................... 359/819; 359/822
(58) Field of Search ................ 359/819, 696, 359/827, 813, 823, 830, 874, 876, 822; 248/564, 560, 565, 569, 576, 582, 589, 592, 593, 603, 607

(56) References Cited

U.S. PATENT DOCUMENTS 4,538,882 A * 9/1985 Tanaka et al. .............. 359/824
5,923,480 A * 7/1999 Labeye ....................... 359/814
6,229,657 B1 * 5/2001 Holderer et al. ............ 359/822

FOREIGN PATENT DOCUMENTS

DE 198 25 716 A1 12/1999
EP 0 053 463 11/1981
EP 0 230 277 B1 1/1987

* cited by examiner

Primary Examiner—Hung Xuan Dang
Assistant Examiner—Joseph Martinez
(74) Attorney, Agent, or Firm—Wells St. John P.S.

(57) ABSTRACT

A mounting device for an optical element in an assembly has a support member 3 with two or more gear elements 1. The support member 3 is connected, on the one hand, to an external mounting structure 30 and, via base points 2, to the gear elements 1. Via top points, the gear elements 1 are connected to the optical element 5 directly, or are connected to the optical element 5 indirectly via a mount 5' arranged therebetween. The top points 4 of the gear elements 1 are located in planes of symmetry of the optical element 5 which are defined by the axial axis and a radial axis of the optical element 5. The gear elements 1 are arranged and dimensioned such that in the event of disturbing influences a compensation effect is produced with regard to the deformation of the optical surface of the optical element 5. The compensation effect is provided when the RMS value of the sum of those partial deformations of the optical surface of the optical element 5 which are caused by an axial force, a radial force and a tangential element at an arbitrary top point 4 of a gear element 1 is smaller by at least the factor 2 than the greatest RMS value of one of the three said partial deformations.

35 Claims, 5 Drawing Sheets

MOUNTING DEVICE FOR AN OPTICAL ELEMENT

This application relates to and claims priority to corresponding German Patent Application No. 100 53 899.1 filed on Oct. 31, 2000.

BACKGROUND OF THE INVENTION

1. Field of the Invention

The invention relates to a mounting device for an optical element in an assembly. More specifically the invention relates to a micro lithographic projection exposure objective having a device for mounting an optical element.

2. Description of the Related Art

Mounting techniques are known for rotationally symmetrical optical elements, in the case of which the optical element is connected to a mounting member via a number of elastic elements. Elastic elements are permanently connected, for example by bonding, to the optical element in the region of the outer edge of the latter, and distributed uniformly over the circumference. The elastic elements are mostly designed as spring arms with an axially and a radially situated bent part. In the case of movements of the base points of the spring arms relative to the optical element, such as occur, for example, during lens mounting as a consequence of manufacturing tolerances and inaccuracies in mounting, the optical element essentially experiences via the spring arm an axial force, a radial force and a tangential moment. Depending on the type of base point movement, the three loads resulting therefrom have a different ratio to one another in terms of sign and absolute value. Apart from the type of base point movement, the spring arm geometry and the selection of material are decisive for the ratio between the three loads. If the spring arms are produced from a linearly elastic material, and if the changes in shape of the spring arms are small, for a given load instance the ratio between the three loads on the optical element is independent of the amplitude of the base point movement.

In order to avoid deformations of the optical element because of manufacturing tolerances and mounting inaccuracies, it is known, for example from EP 0230277 B1 and EP 0053463 B1, to create a constructive type of physical mounting for the optical element by means of which the joint between the optical element and the mount is configured in an appropriately soft fashion so that loads occurring can be decoupled as far as possible from the optical element. However, in this case there is a problem that it is impossible to make the joint too soft for example because of the natural frequency requirements.

Reference may be made further to DE 198 25 716 A1 and U.S. Pat. No. 5,428,482 regarding the prior art.

It is the object of the present invention to create a device for mounting an optical element, the aim being that loads occurring do not have a negative effect on the optical element, in particular not in the form of surface deformations.

SUMMARY OF THE INVENTION

According to the invention, this object is achieved by means of a mounting device for an optical element in an assembly having the following features:

1.1 a support member and two or more gear elements, 1.2 the support member is connected to an external mounting structure and, via base points, to the gear elements, 1.3 via top points, the gear elements are connected to the optical element directly, or are connected to the optical element indirectly via a mount arranged therebetween, 1.4 the top points of the gear elements are located in planes of symmetry of the optical element which are defined by an axial axis and a radial axis of the optical element, 1.5 the gear elements are arranged and dimensioned such that in the event of disturbing influences a compensation effect is produced with regard to a deformation of an optical surface of the optical element, 1.6 the compensation effect being provided when a RMS value of the sum of those partial deformations of the optical surface of the optical element which are caused by an axial force, a radial force and a tangential element at an arbitrary top point of a gear element is less than or at least equal to one half of the largest RMS value of one of the three said partial deformations.

A ratio in which the two-wave components of deformation of the optical surface of the optical element cancel one another out is found by a configuration, according to the invention, of the gear elements and by an appropriate selection of the joining points of the optical element or of an optical assembly in the case of one or more of the three load instances, that is to say an axial base point displacement, a radial base point displacement and a tangential base point rotation for the axial forces, radial forces and the tangential moments at each joining point. Assuming that the total stiffnesses remain the same in all design variants of the gear elements, in the case of complete compensation of the two-wave deformation components a point is reached at which the aspherical component of the deformation is close to a minimum as a function of the load ratios. The minimum of the aspherical deformation can then be found easily by means of small corrections in the load ratio provided by the gear elements.

Mounting carried out in this way according to the invention uses the transmission of deformations of the base point plane, which in the case of lenses is mostly a mounting ring, to the optical element by comparison with mounting with the aid of a spring arm mount of known type with similarly large stiffnesses by one to two orders of magnitude.

Moreover, it is possible by means of the type of mounting described to minimize deformations which are caused by bearing reactions which are in equilibrium with accelerating forces such as, for example, the weight force. In other words, this means that acceleration-induced deformations of the optical surface are likewise minimized.

According to the invention, the compensation mechanism requires that the two-wave partial deformations which are caused by the axial forces, radial forces and the tangential moments at the individual joining points, have the same angular orientation. For this purpose, all the gear elements must lie in a plane of symmetry of the optical element. This is so at any point in the case of lenses, and in the case of optical elements whose outer contour is not found, a sufficient number of planes of symmetry must be present for mounting.

Analyses carried out on models, such as a finite element analysis, for example, of the optical element, or with the aid of suitable measurements on a real optical element, can be used to determine for each joining point the way in which axial and radial forces and tangential moments introduced there affect the optical surface. Whilst, for example, a Zernike analysis can supply the sensitivity of the two-wave deformation of the optical surface to the respectively introduced load. The sensitivities thus determined can be used to determine for each joining point one or more ratios of the three loads to one another in the case of which the desired compensation effect occurs.

The solution according to the invention is therefore joining elements or gear elements which provide for one or more types of base point movements a suitable ratio for the compensation of the two-wave deformation components, and can be designed as a mechanical spring joint gear. The optical element, for example a lens, can be connected either directly to the gear elements or indirectly via a mount arranged therebetween.

According to the invention, it is not the forces acting on the optical element or the mount which are compensated, but the partial deformations on the optical surface which are caused by these forces. Although as the forces at the joining points to the optical element or to the mounted optical element are defined, specifically as axial force, radial force etc., they cannot cancel one another out, since they are orthogonal, each of the six individual loads causes a partial deformation on the optical surface, depending on the joining point. These partial deformations are no longer orthogonal, but partially rendered highly unidirectional. It is precisely this unidirectional characteristic which provides the basis for the capability for compensation.

In order to achieve exactly reproducible results, the gear elements should have struts, articulated joints leaf springs or combinations of said elements, the aim being for the articulated joints to be free from backlash and latching moments. Solid articulated joints can preferably be used for this purpose.

The compensation effect is provided according to the invention for disturbances which lead to a variation in the relative position and the orientation of the base points of the gear elements. The same also holds for variations in the joining loads at the top points of the gear elements which are caused by accelerations.

Particularly advantageous-results are achieved when the diameter/thickness ratio of the optical element is greater than 2:1.

In the case of an optical element provided with a mount, the joints of the optical element to the mount should advantageously be in the range between the outside diameter and half the outside diameter of the optical element.

The deformation distributions caused respectively by axial forces, radial forces and tangential moments (individual loads) must be very similar with regard to their characteristic spatial distribution, because this is a precondition for being able to achieve a compensation effect by means of suitable gear elements.

The further outward the joining point is situated, the more similar become the deformation distributions of the respective individual loads of a joining point, and the more effectively a compensation effect can be achieved. If the joining point moves very far inward, the deformation distributions of the individual loads are dissimilar starting from a specific limit, and so effective compensation is no longer possible.

DETAILED DESCRIPTION OF THE PREFERED EMBODIMENTS

Figure 1:
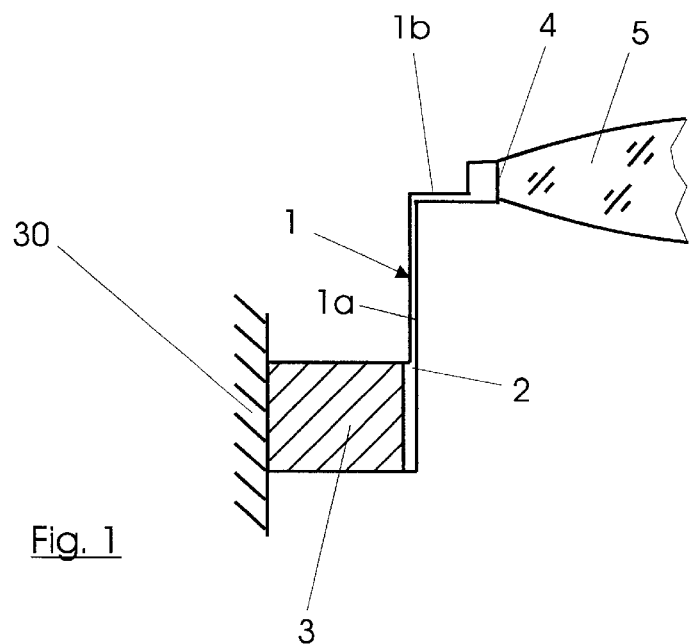
FIG. 1 shows a schematic of an elastic joining element as spring arm.

FIG. 1 shows, in a representation of the principle, the spring geometry of a gear element 1 which is designed with an axially situated torsion spring 1a and a radial torsion spring 1b, and thereby forms an angular shape. A plurality of gear elements 1 arranged in a fashion distributed uniformly over the circumference are in each case connected to a support member 3 at one end via base points 2. The support member 3 is connected (in a way not shown in more detail) to an external mounting structure 30 or an assembly which, for example, forms a lens for a semiconductor lithography exposure system. Via the radially situated torsion spring 1b and a top point 4, in each case, a joint to an optical element 5, which is a lens in the case of the exemplary embodiments discussed below, made at the other end of the gear element 1.

Figures 2A, 2B, 2C:
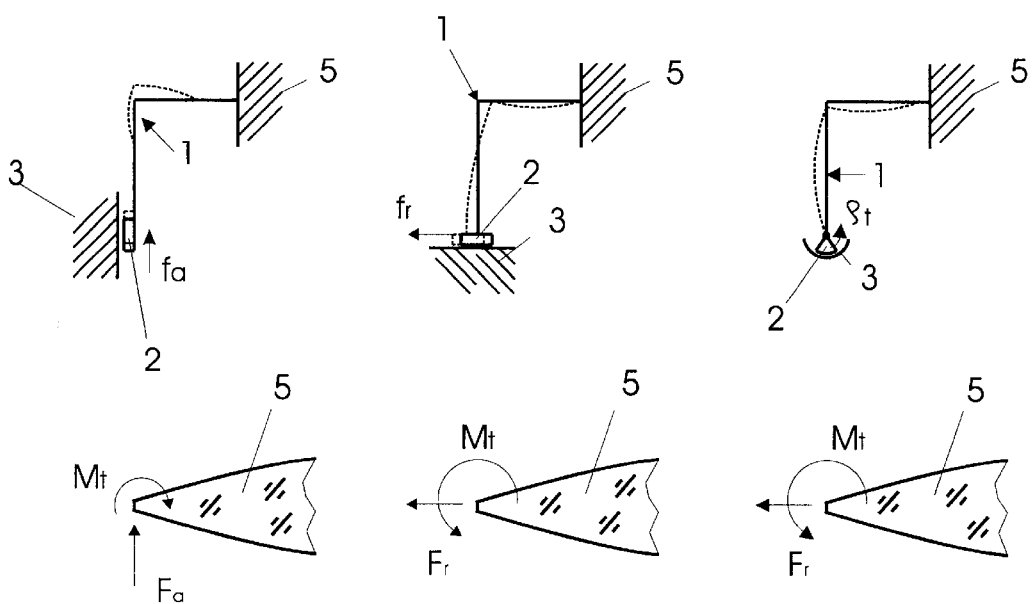
FIG. 2a shows a load instance with an axial base point displacement with the main loads.
FIG. 2b shows a load instance with a radial base point displacement with the main loads.
FIG. 2c shows a load instance with a tangential rotation with the main loads.

The various load instances and main loads resulting therefrom on the optical element 5 may be seen in FIGS. 2a, 2b and 2c. An axial displacement of the base point 2 is illustrated as load instance 1 in FIG. 2a. The loads at the top point 4 or at the joining point to the optical element 5 may be seen from the illustration of FIG. 2a shown below.

FIG. 2b shows a load instance 2 with a radial displacement of the base point 2, once again the associated main loads at the top point 4 or at the joining point to the optical element 5 being illustrated in the lower illustration of FIG. 2b.

FIG. 2c shows as load instance 3 a tangential rotation in the area of the base point 2. Here, as well, the main loads resulting therefrom at the associated top point 4 or at the joining point of the optical element 5 may be seen in the lower illustration of FIG. 2c.

The illustrated load instances 1, 2 and 3 and the forces and moments, associated therewith, on the optical element 5, lead to deformation of the optical surface of the optical element. If the deformation is described with the aid of the Zernike polynomial, it is established that a substantial proportion falls on terms which together form what is termed the two-wave nature. If separate consideration is now given to those deformations which stem from the axial forces, radial forces and tangential moments, on the optical element, it is established that the two-wave component of the respective deformation is very strongly expressed in the case of all three partial deformations. All instances of a two-wave nature have the same angular orientation and differ otherwise only in sign and in absolute value.

Illustrated in FIGS. 3 to 9 in principle are various gear elements 1 which are arranged and dimensioned such that in the event of the abovementioned disturbing influences they produce a compensation effect with regard to deformation of the optical surface of the optical element 5. The compensation effect is provided in this case when the RMS (route mean square) value of the sum of those partial deformations of the optical surface of the optical element 5 which are caused by an axial force, a radial force and a tangential moment at an arbitrary top point 4 of a gear element 1 is smaller by at least the factor 2 (half of the value), preferably smaller by 4 (a quarter of the value), than the greatest RMS value of one of the three said partial deformations. This holds for a combination effect for disturbances which lead to a variation in the relative position and orientation of the base points of the gear elements, and also for changes to the joining loads at the top points of the gear elements which are caused by accelerations such as, for example, weight forces.

Figure 3:
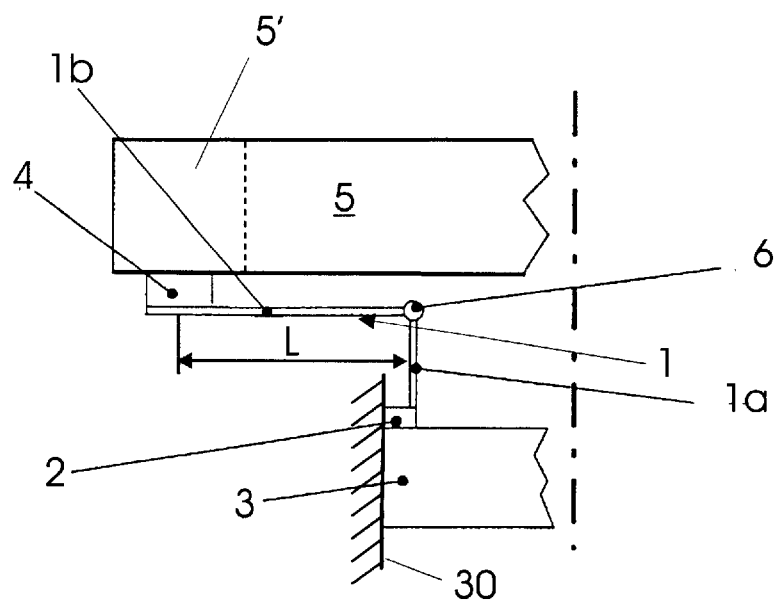
FIG. 3 shows a first embodiment of a gear element with an angular spring arm.

FIG. 3 shows an exemplary embodiment having a gear element 1 which is connected via a base point or joining piece 2 to the support member 3 by means of a strut or leaf spring 1a which is axially aligned. An articulated joint 6 with a tangential axis of rotation is arranged at the other end of the strut 1a. A second strut 1b or leaf spring with a radial alignment is connected at one end to the articulated joint 6, and at the other end, at the top point 4 or joining piece, to the optical element 5. By contrast to the prior art, in this case the strut 1b extends radially from inside outward from its connection to the strut 1a or the articulated joint 6. Instead of a joint directly to the lens 5, the joining of the strut 1b can also be performed at a mount 5' (indicated by dashes). The same also holds, moreover, for the embodiments still to be described below.

Figure 4:
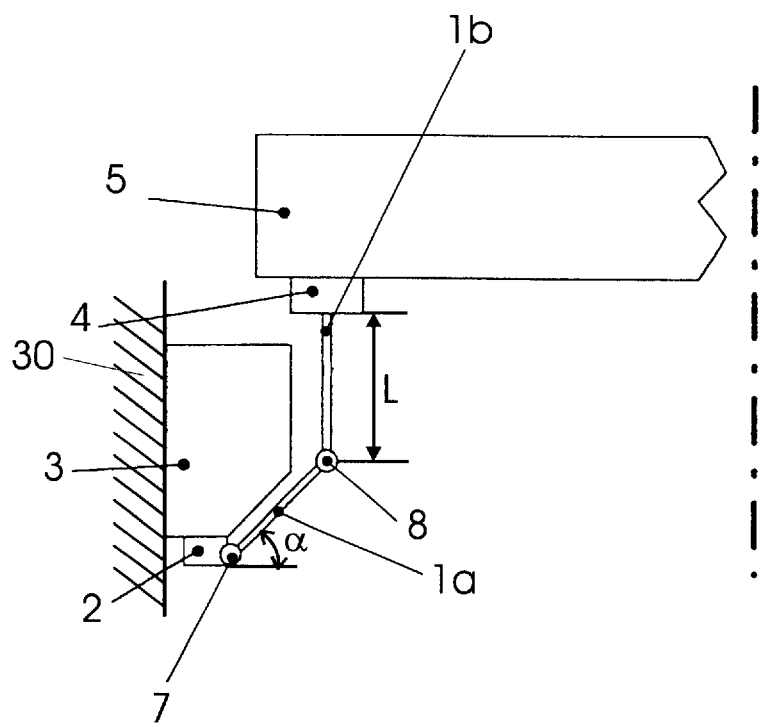
FIG. 4 shows a second embodiment of a gear element with two struts.

FIG. 4 shows a strut 1a of the gear element 1 which is aligned at an angle α, which is between 0° and 90°, normal to a plane with an axial surface. The strut 1a is pivoted at its base point 2 of a base point articulated joint 7, and connected to the support member 3 via a joining piece. At the end of the strut 1a averted from the base point 2, a second articulated joint 8 is located which is connected to a second axially aligned strut 1b. The base point articulated joint 7 has a tangential axis of rotation, and the articulated joint 8 is provided with a tangential axis of rotation. The strut 1b is connected at its end averted from the second articulated joint 8 to its axial alignment at the top point 4, or via a joining piece to the optical element 5.

Figure 5:
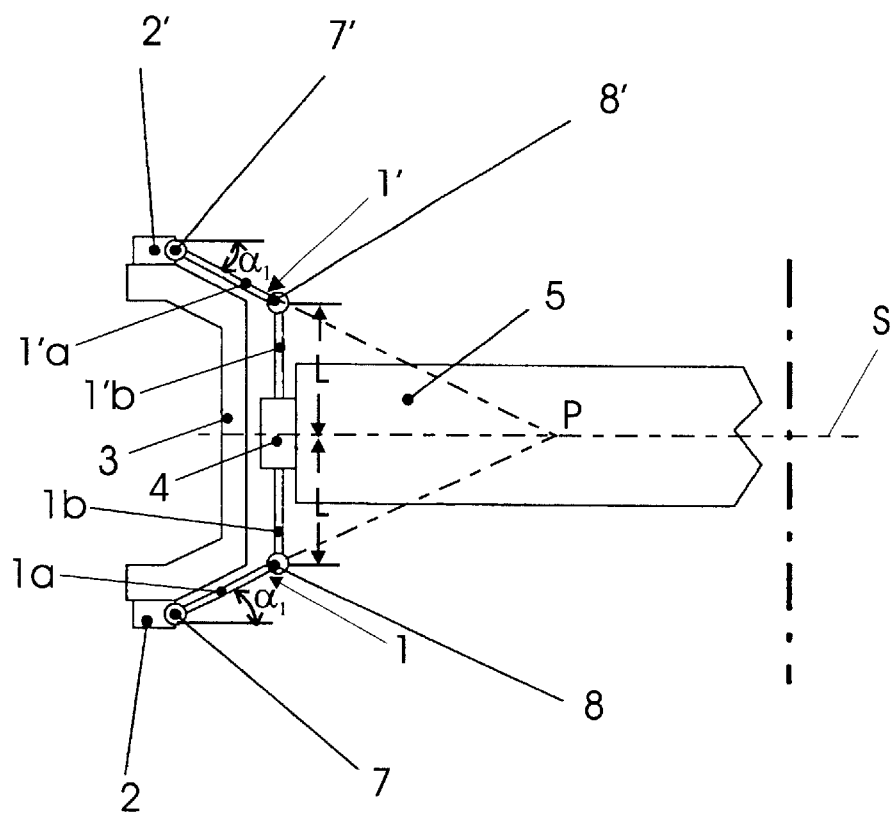
FIG. 5 shows a further embodiment of a gear element with two oblique struts and a common joint at an optical element.

FIG. 5 illustrates an exemplary embodiment which comprises two gear elements 1 and 1' arranged in mirror-image fashion relative to one another. As may be seen, this embodiment constitutes a "doubling" of the exemplary embodiment illustrated in FIG. 4, the two axially extending struts 1b and 1'b then being at a common head point or joining piece 4 in order to connect to the optical element 5.

As may be seen, the second gear element 1' is arranged opposite the first gear element 1 in a mirror-image fashion, the reflecting planes having an axial surface normal. The two gear elements 1 and 1' in this way form a four-bar linkage in which the instantaneous pole of the movement of the top point or joining piece 4 lies in a plane which has an axial surface normal and which is situated at the level of the top point 4. (What is meant in this case is that movement of the top point or joining piece 4 when the optical element or the mount 5' of the optical element 5 has not yet been adapted.)

Figure 6:
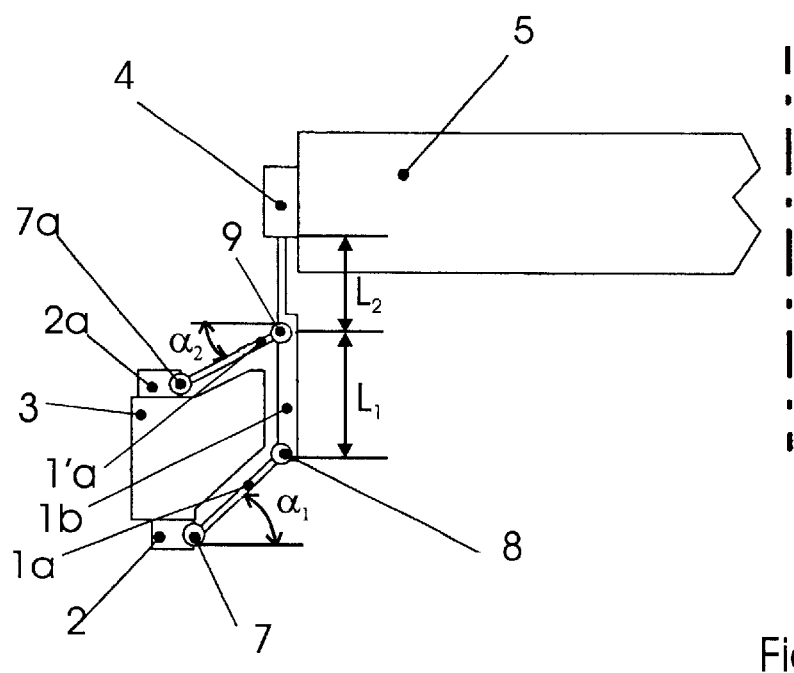
FIG. 6 shows an embodiment of a gear element with two obliquely running struts and a common strut for joining at an optical element.

FIG. 6 describes an exemplary embodiment, in which two base points or joining pieces 2 and 2a may be provided on the support member 3. Just as in the case of the exemplary embodiments according to FIGS. 4 and 5, the struts 1a and 1'a run at an angle α1, which is between 0 and 90°, and an angle α'1 to a plane with an axial surface normal. The two struts 1a and 1'a are respectively connected to the support member 3 via a base point articulated joint 7 or 7a, respectively. The base point articulated joint 7 is likewise provided with a tangential axis of rotation. A second articulated joint 8 for the tangential axis of rotation is connected to the strut 1a on the end averted from base point 2. The strut 1'a is connected at its end averted from the base point articulated joint 7' to the third articulated joint 9, which is likewise provided with a tangential axis of rotation. The third articulated joint 9 is arranged in the middle region of the strut 1b, which is axially aligned. The axial strut 1b is connected with one end to the second articulated joint 8, while it is connected at the other end to the optical element 5 at the top point or joining piece 4.

Figure 7:
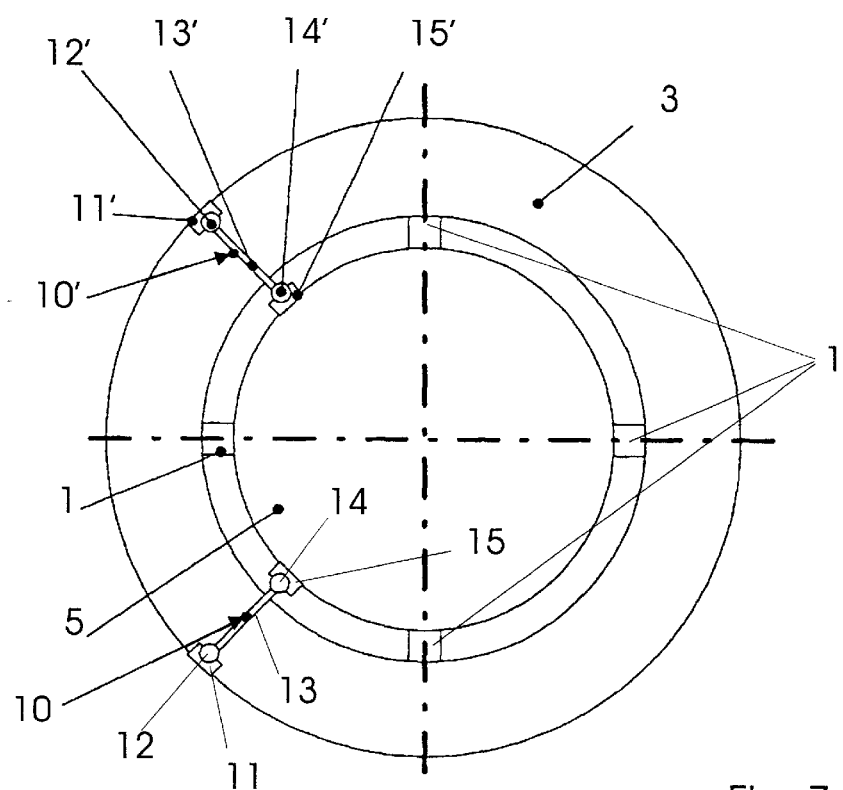
FIG. 7 shows two additional gear elements between the support member and the optical element for the purpose of increasing the stiffness of lateral sliding movements.

FIG. 7 shows in plan view an exemplary embodiment with two additional gear elements 10 and 10' between the support member 3 and the optical element 5. The "customary" gear elements 1 are only indicated in FIG. 7 with a total of 4 elements distributed over the circumference. The additional gear elements 10 and 10' increase the stiffness of lateral displacement movements between the support member 3 and the optical element 5. The additional gear elements 10 and 10' comprise one joining piece or base point 11 and 11' each to the support member, and a base point articulated joint 12 or 12', respectively. The articulated joint 12 or 12' is provided with tangential and axial degrees of rotational freedom. A leaf spring or strut 13 is radially aligned and connected at one end to the base point articulated joint 12 or 12'. The respective other end of the strut 13 or 13' is respectively connected via an articulated joint 14 or 14' with a tangential or axial degree of rotational freedom to the top point or to the joining piece 15 or 15'. The joining piece 15 or 15' forms the joint to the optical element 5.

Figure 8:
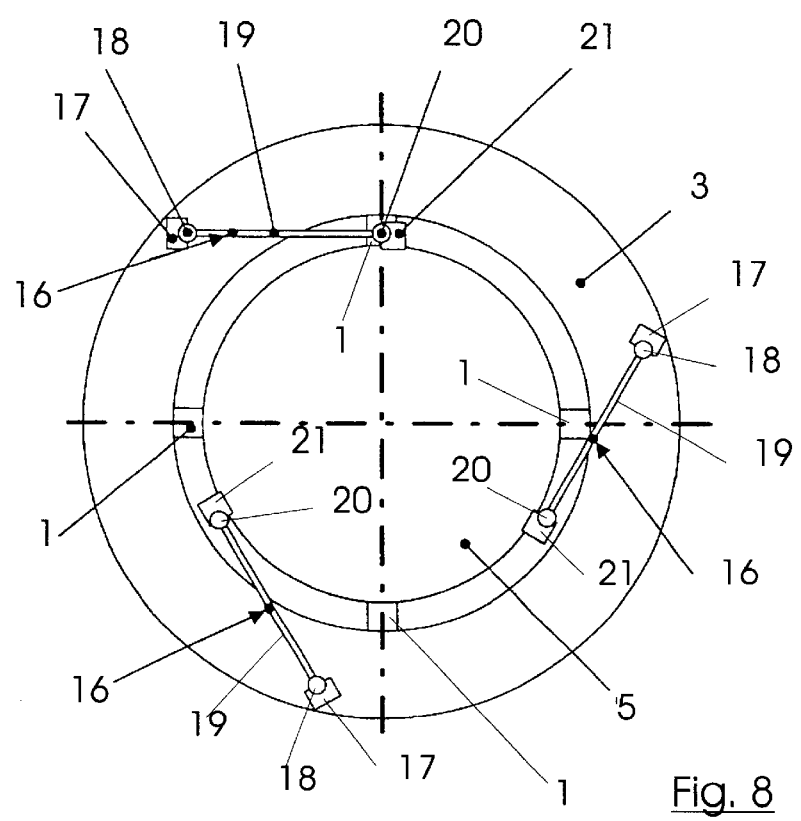
FIG. 8 shows three additional gear elements between a support member and an optical element for the purpose of increasing the stiffness of lateral displacement movements and axial rotation.

Three additional gear elements 16 which are arranged distributed uniformly over the circumference are illustrated in FIG. 8. Three additional gear elements 16 are arranged between the support member 3 and the optical element 5 and have the function of increasing the stiffness of lateral displacement movements and axial rotation between the support member 3 and the optical element 5.

Each of the three gear elements 16 has a base point articulated joint 18 with tangential and axial degrees of rotational freedom, and is connected to the support member 3 via a joining piece or a base point 17. A strut 19 aligned tangential to the optical element 5 is connected in each case at one end to the respective base point articulated joint 18, and with its other end to a top point articulated joint 20. The top point articulated joint 20 is provided with axial and tangential degrees of rotational freedom. Each top point articulated joint 20 is connected via a top point or a joining piece 21 to the optical element 5.

Figure 9:
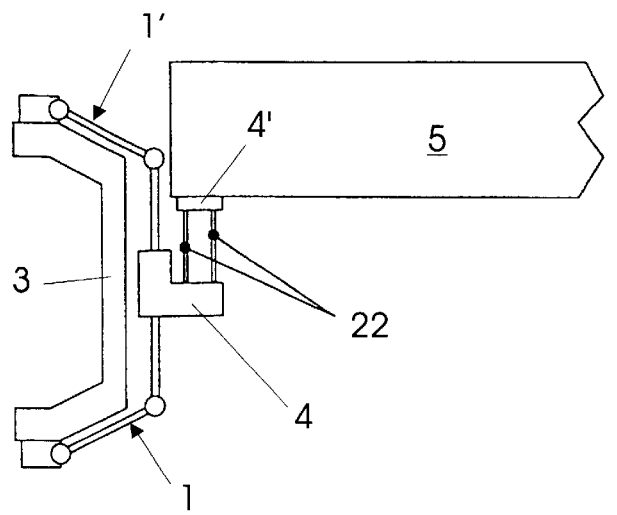
FIG. 9 shows a gear element which is provided with additional leaf springs.

Illustrated in FIG. 9 is a refinement of a gear element 1 and a gear element 1' which is arranged as a mirror image thereof and is similar in design to the exemplary embodiment described with the aid of FIG. 5. Instead of the two gear elements 1 and 1' being joined directly, here the joint is performed via leaf springs 22 interposed therebetween, two leaf springs 22 arranged next to one another or radially one behind another being provided in FIG. 9, for example. The leaf springs 22 are connected in this case to the optical element 5 at a respective end via the joining piece 4', while the respective other end is fastened on the joining piece 4 by means of which the two gear elements 1 and 1' are connected to one another. In principle, the gear element design is, however, the same as with the exemplary embodiment according to FIG. 5. The additional leaf springs 22 can also be used in the other exemplary embodiments. This relates, in particular, to the gear elements according to FIG. 3 and to FIG. 6, in the case of which the instantaneous pole of movement of the joining piece relative to the optical element 5 does not lie at the level of this joining element or the top point 4. What is meant in this case is that movement of the joining piece if the optical element 5 has not yet been adapted.

The additional leaf springs produce a lowering of the radial stiffness of the connection, implemented with the aid of the respective gear element 1, between the support member 3 and the optical element 5.

Figure 10:
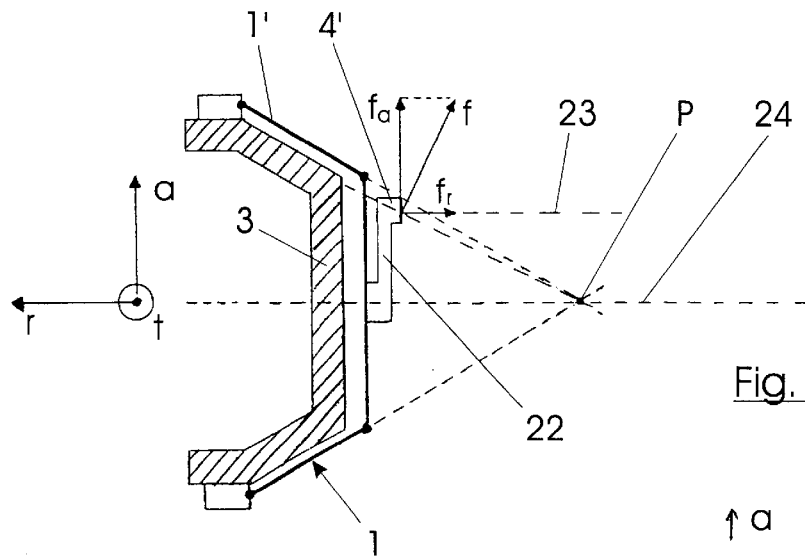
FIG. 10 shows the force diagram for an embodiment according to FIG. 9.

FIG. 10 illustrates in relation to FIG. 9 the arrangement in which the joining plane 23 is different to the instantaneous pole plane 24. "P" specifies the instantaneous pole of the movement of the four-bar gear. The movement vector f in the gear element head 4' then also comprises a radial component fr in addition to an axial component fa. Consequently, a relatively large radial force would act on the optical element when the optical element is mounted. This radial force can then be so large that simple variation in the gear parameters renders it impossible to achieve a ratio of axial force, radial force and tangential movement suitable for compensation. The additional leaf springs 22 are used for this reason. The radial force occurring in the case of base point movements is thereby reduced so strongly at the top point 4' as to enable a tuning of the load ratios which is suitable for compensation.

In the exemplary embodiments described above, the gear elements are respectively joined directly to the optical element. Of course, it is also possible within the scope of the invention for the gear elements to be joined to a mounted optical element or to a mount 5' of the optical element 5 (as indicated in FIG. 3).

Figure 11:
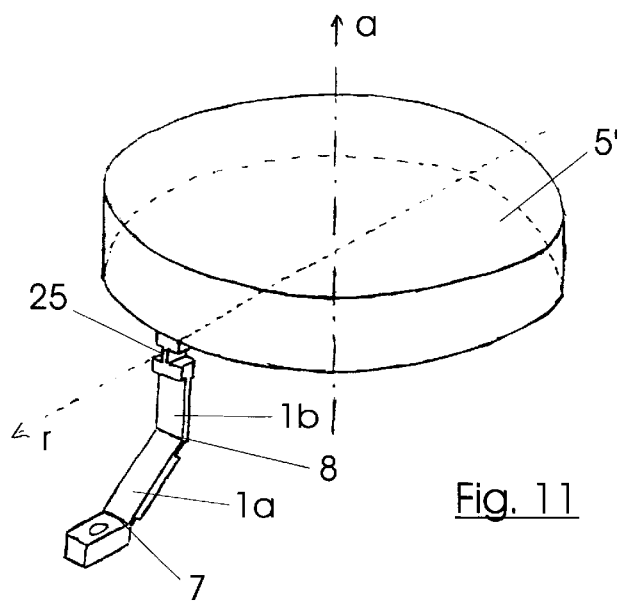
FIG. 11 shows a gear element with additional rotary joints with radial axes of rotation.

FIG. 11 shows a refinement of a gear element with additional rotary joints 25 (only one being illustrated in the drawing for the sake of simplicity) with radial axes of rotation. As may be seen, the additional rotary joint 25 is designed as a solid articulated joint with thin connecting web, in order to minimize the transmission of radial moments to the optical element 5 or mount 5' thereof. Here, the additional rotary joint 25 is illustrated with the aid of an exemplary embodiment according to FIG. 4. Of course, such additional rotary joints 25 are also possible in the case of the other exemplary embodiments.

What is claimed is:

1. A mounting device for an optical element in an assembly having the following features:
   1.1 a support member and two or more gear elements,
   1.2 the support member is connected to an external mounting structure and, via base points, to the gear elements,
   1.3 via top points, the gear elements are connected to the optical element directly, or are connected to the optical element indirectly via a mount arranged therebetween,
   1.4 the top points of the gear elements are located in planes of symmetry of the optical element which are defined by an axial axis and a radial axis of the optical element,
   1.5 the gear elements are arranged and dimensioned such that in the event of disturbing influences a compensation effect is produced with regard to a deformation of an optical surface of the optical element,
   1.6 the compensation effect being provided when a RMS value of the sum of those partial deformations of the optical surface of the optical element which are caused by an axial force, a radial force and a tangential element at an arbitrary top point of a gear element is less than or at least equal to one half of the largest RMS value of one of the three said partial deformations.

2. The device as claimed in claim 1, wherein the RMS value is less than or equal to a quarter of the largest RMS value of one of the three said partial deformations.

3. The device as claimed in claim 1, wherein said gear elements are struts, articulated joints or leaf springs, the articulated joints being free from backlash and latching moments.

4. The device as claimed in claim 3, wherein said articulated joints are designed at least partially as solid articulated joints.

5. The device as claimed in claim 1, wherein the compensation effect is provided for disturbances which lead to a variation in the relative position and the orientation of the base points of said gear elements.

6. The device as claimed in claim 1, wherein the compensation effect is provided for variations in joining loads at the top points of said gear elements which are caused by accelerations.

7. The device as claimed in claim 1, wherein said optical element is provided with a mount, the joints of the optical element to the mount are in the range between an outside diameter and half an outside diameter of the optical element.

8. The device as claimed in claim 1, wherein said gear element has an axially aligned strut which forms at one end a base point to the support member, while the other end is connected to an articulated joint which is provided with a tangential axis of rotation, a second radially aligned strut being joined with one end to the articulated joint, the other end forming a top point to the optical element or the mount thereof.

9. The device as claimed in claim 1, wherein said gear element is connected to the support member via a base point articulated joint with a tangential axis of rotation as base point, a strut being connected to said base point articulated joint at one end and to a second articulated joint and being aligned at an angle α to a plane with an axial surface normal, the angle α being between 0 and 90° and the second articulated joint having a tangential axis of rotation, and there being joined to the second articulated joint in axial alignment a second strut which forms at its other end the top point to the optical element or the mount thereof.

10. The device as claimed in claim 9, wherein in addition to said gear element formed from said base point articulated joint, the first strut, the second articulated joint and the second strut, a further gear element is provided which is arranged as a mirror image thereof, both second struts having a common top point as joint to the optical element or mount thereof.

11. The device as claimed in claim 10, wherein a reflecting planes (S) has an axial surface normal, and in that the two gear elements arranged as mirror images, then form a four-bar linkage in which an instantaneous pole P of the movement of a common top point lies in a plane which has an axial surface normal and is situated at the level of the top point.

12. The device as claimed in claim 1, wherein said gear element is formed from the following individual parts:
   a) a base point articulated joint with a tangential axis of rotation is arranged at the base point, b) a first strut is connected at one end to the base point articulated joint, and at the other end to a second articulated joint, c) the first strut is aligned at an angle $\alpha 1$ to a plane with an axial surface normal, the angle $\alpha$ being between 0 and 90°, d) the second articulated joint has a tangential axis of rotation, e) a second joining piece on the support member forms a second connecting element to the support member, f) a second base point articulated joint with a tangential axis of rotation is connected to the joining piece, g) a second strut is connected at one end to the second base point articulated joint and at the other end to a third articulated joint, h) the second strut is aligned at an angle $\alpha 2$ to a plane with an axial surface normal, i) the angle $\alpha 2$ is between 0 and 90°, j) a third strut is connected with one of its ends to the second articulated joint, in the middle region to the third articulated joint and at the other end to the top point as joining piece to the optical element or to the mount of the optical element, and k) the third strut is aligned axially.

13. A device as claimed in claim 1, wherein in addition to said gear elements two additional gear elements between the support member and the optical element or the mount thereof are provided for the purpose of increasing the stiffness of lateral displacement movements between the support member and the optical element or the mount thereof, having the following features:

a) in each case a joining piece to the support member, b) an articulated joint with tangential and axial degrees of rotational freedom, which is connected to the joining piece, c) a radially aligned strut which is connected at one end to the articulated joint, and at the other end to a second articulated joint, d) the second articulated joint is provided with tangential and axial degrees of rotational freedom, and e) the second articulated joint is connected to a second joining piece which forms the joint to the optical element or the mount thereof.

14. The device as claimed in claim 1, wherein in addition to the gear elements three additional gear elements between the support member and the optical element or the mount thereof are provided for the purpose of increasing the stiffness of lateral displacement movements and axial rotation between the support member and the optical element or the mount thereof, having the following features:

a) a joining piece to the support member, b) a first articulated joint with tangential and axial degrees of rotational freedom, which is connected to the joining piece, c) a tangentially aligned strut with first and second ends, wherein the strut is connected at the first end to the first articulated joint and at the second end to a second articulated joint, d) the second articulated joint is provided with tangential and axial degrees of rotational freedom, and is connected to a second joining piece, and e) the second joining piece forms the joint to the optical element or the mount thereof.

15. The device as claimed in claim 1, wherein swivel joints with a radial axis of rotation are additionally fitted as joining points to the optical element or the mount thereof in order to minimize a transmission of radial moments to the optical element or the mount thereof in the region of the respective top points.

16. The device as claimed in claim 1, wherein said gear elements are provided with additional leaf springs between the support member and the optical element or the mount thereof.

17. The device as claimed in claim 1, wherein the optical element is a lens.

18. A micro lithographic projection exposure objective having a device for mounting an optical element with the following features:

1.1 a support member and two or more gear elements, 1.2 the support member is connected to an external mounting structure and, via base points, to the gear elements, 1.3 via top points, the gear elements are connected to the optical element directly, or are connected to the optical element indirectly via a mount arranged therebetween, 1.4 the top points of the gear elements are located in planes of symmetry of the optical element which are defined by an axial axis and a radial axis of the optical element, 1.5 the gear elements are arranged and dimensioned such that in the event of disturbing influences a compensation effect is produced with regard to a deformation of an optical surface of the optical element, 1.6 the compensation effect being provided when a RMS value of the sum of those partial deformations of the optical surface of the optical element which are caused by an axial force, a radial force and a tangential element at an arbitrary top point of a gear element is less than or at least equal to one half of the largest RMS value of one of the three said partial deformations.

19. A mounting device for an optical element in an assembly having the following features:

1.1 a support member and two or more gear elements, 1.2 the support member is connected to an external mounting structure and, via base points, to the gear elements, 1.3 via top points, the gear elements are connected to the optical element directly, or are connected to the optical element indirectly via a mount arranged therebetween, 1.4 the top points of the gear elements are located in planes of symmetry of the optical element which are defined by an axial axis and a radial axis of the optical element 1.5 wherein an axial force applied to an arbitrary one of said top points causes a first partial deformation of said optical surface, said first partial deformation having a first RMS value, wherein a radial force applied to an arbitrary one of said top points causes a second partial deformation of said optical surface having a second RMS value, wherein a tangential momentum applied to an arbitrary one of said top points causes a third partial deformation of said optical surface having a third RMS value, wherein one of said first, second and third RMS values having a largest absolute value being a largest RMS value, a sum of said first, second and third partial deformations causing an overall deformation of said optical surface with a sum RMS value, 1.6 and wherein the gear elements are arranged and dimensioned such that said overall deformation of said optical surface is compensated in a manner that the sum RMS value is less than or equal to one half of the largest RMS value of said partial deformations.

20. The device as claimed in claim 19, wherein the RMS value is less than or equal to a quarter of the largest RMS value of one of the three said partial deformations.

21. The device as claimed in claim 19, wherein said gear elements are struts, articulated joints or leaf springs, the articulated joints being free from backlash and latching moments.

22. The device as claimed in claim 21, wherein said articulated joints are designed at least partially as solid articulated joints.

23. The device as claimed in claim 19, wherein the compensation effect is provided for disturbances which lead to a variation in the relative position and the orientation of the base points of said gear elements.

24. The device as claimed in claim 19, wherein the compensation effect is provided for variations in joining loads at the top points of said gear elements which are caused by accelerations.

25. The device as claimed in claim 19, wherein said optical element is provided with a mount, the joints of the optical element to the mount are in the range between an outside diameter and half an outside diameter of the optical element.

26. The device as claimed in claim 19, wherein said gear element has an axially aligned strut which forms at one end a base point to the support member, while the other end is connected to an articulated joint which is provided with a tangential axis of rotation, a second radially aligned strut being joined with one end to the articulated joint, the other end forming a top point to the optical element or the mount thereof.

27. The device as claimed in claim 19, wherein said gear element is connected to the support member via a base point articulated joint with a tangential axis of rotation as base point, a strut being connected to said base point articulated joint at one end and to a second articulated joint and being aligned at an angle α to a plane with an axial surface normal, the angle α being between 0 and 90° and the second articulated joint having a tangential axis of rotation, and there being joined to the second articulated joint in axial alignment a second strut which forms at its other end the top point to the optical element or the mount thereof.

28. The device as claimed in claim 27, wherein in addition to said gear element formed from said base point articulated joint, the first strut, the second articulated joint and the second strut, a further gear element is provided which is arranged as a mirror image thereof, both second struts having a common top point as joint to the optical element or mount thereof.

29. The device as claimed in claim 28, wherein a reflecting planes (S) has an axial surface normal, and in that the two gear elements arranged as mirror images, then form a four-bar linkage in which an instantaneous pole P of the movement of a common top point lies in a plane which has an axial surface normal and is situated at the level of the top point.

30. The device as claimed in claim 19, wherein said gear element is formed from the following individual parts:
   a) a base point articulated joint with a tangential axis of rotation is arranged at the base point,
   b) a first strut is connected at one end to the base point articulated joint, and at the other end to a second articulated joint,
   c) the first strut is aligned at an angle α1 to a plane with an axial surface normal, the angle α being between 0 and 90°,
   d) the second articulated joint has a tangential axis of rotation,
   e) a second joining piece on the support member forms a second connecting element to the support member,
   f) a second base point articulated joint with a tangential axis of rotation is connected to the joining piece,
   g) a second strut is connected at one end to the second base point articulated joint and at the other end to a third articulated joint,
   h) the second strut is aligned at an angle α2 to a plane with an axial surface normal,
   i) the angle α2 is between 0 and 90°,
   j) a third strut is connected with one of its ends to the second articulated joint, in the middle region to the third articulated joint and at the other end to the top point as joining piece to the optical element or to the mount of the optical element, and
   k) the third strut is aligned axially.

31. A device as claimed in claim 19, wherein in addition to said gear elements two additional gear elements between the support member and the optical element or the mount thereof are provided for the purpose of increasing the stiffness of lateral displacement movements between the support member and the optical element or the mount thereof, having the following features:
   a) in each case a joining piece to the support member,
   b) an articulated joint with tangential and axial degrees of rotational freedom, which is connected to the joining piece,
   c) a radially aligned strut which is connected at one end to the articulated joint, and at the other end to a second articulated joint,
   d) the second articulated joint is provided with tangential and axial degrees of rotational freedom, and
   e) the second articulated joint is connected to a second joining piece which forms the joint to the optical element or the mount thereof.

32. The device as claimed in claim 19, wherein in addition to the gear elements three additional gear elements between the support member and the optical element or the mount thereof are provided for the purpose of increasing the stiffness of lateral displacement movements and axial rotation between the support member and the optical element or the mount thereof, having the following features:
   a) a joining piece to the support member,
   b) a first articulated joint with tangential and axial degrees of rotational freedom, which is connected to the joining piece,
   c) a tangentially aligned strut with first and second ends, wherein the strut is connected at the first end to the first articulated joint and at the second end to a second articulated joint,
   d) the second articulated joint is provided with tangential and axial degrees of rotational freedom, and is connected to a second joining piece, and
   e) the second joining piece forms the joint to the optical element or the mount thereof.

33. The device as claimed in claim 19, wherein swivel joints with a radial axis of rotation are additionally fitted as joining points to the optical element or the mount thereof in order to minimize a transmission of radial moments to the optical element or the mount thereof in the region of the respective top points.

34. The device as claimed in claim 19, wherein said gear elements are provided with additional leaf springs between the support member and the optical element or the mount thereof.

35. The device as claimed in claim 19, wherein the optical element is a lens.

* * * * *

UNITED STATES PATENT AND TRADEMARK OFFICE
CERTIFICATE OF CORRECTION

PATENT NO. : 6,552,862 B2
DATED : April 22, 2003
INVENTOR(S) : Thomas Dieker

It is certified that error appears in the above-identified patent and that said Letters Patent is hereby corrected as shown below:

Column 3,
Line 37, "Particularly advantageous-results are achieved when the" with -- Particularly advantageous results are achieved when the --

Column 6,
Line 14, "1a on the end averted from base point 2. The strut 1'a is" with -- 1a on the end averted from the base point 2. The strut 1'a is --

Column 7,
Line 47, replace "designed as a solid articulated joint withthin connecting" with
-- designed as a solid articulated joint with a thin connecting --

Signed and Sealed this

Twenty-seventh Day of July, 2004

JON W. DUDAS
*Acting Director of the United States Patent and Trademark Office*